April 15, 1958     R. A. MAHLMEISTER     2,830,572
MACHINE TOOL
Filed Oct. 25, 1955     3 Sheets-Sheet 1
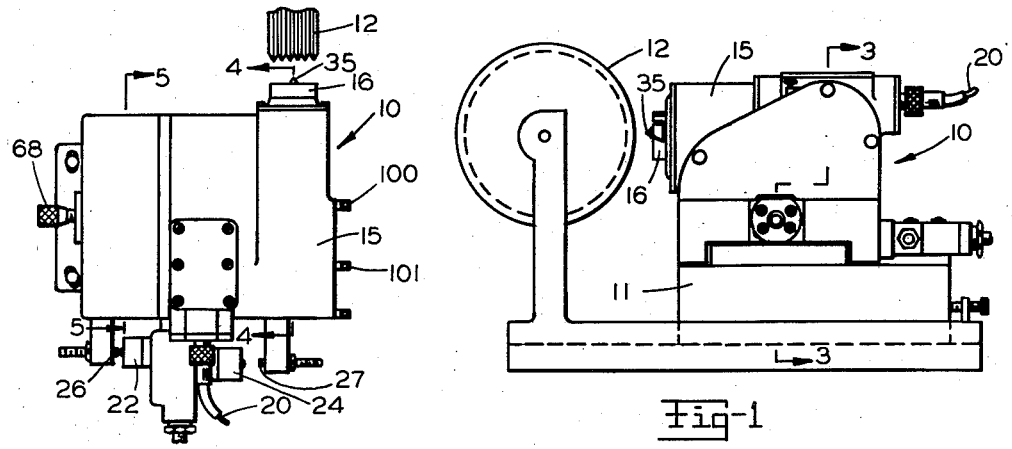
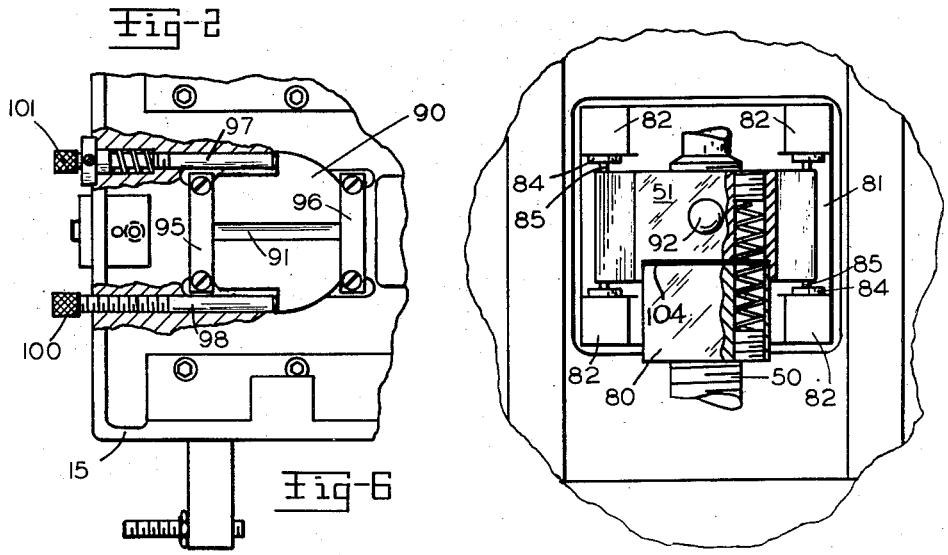
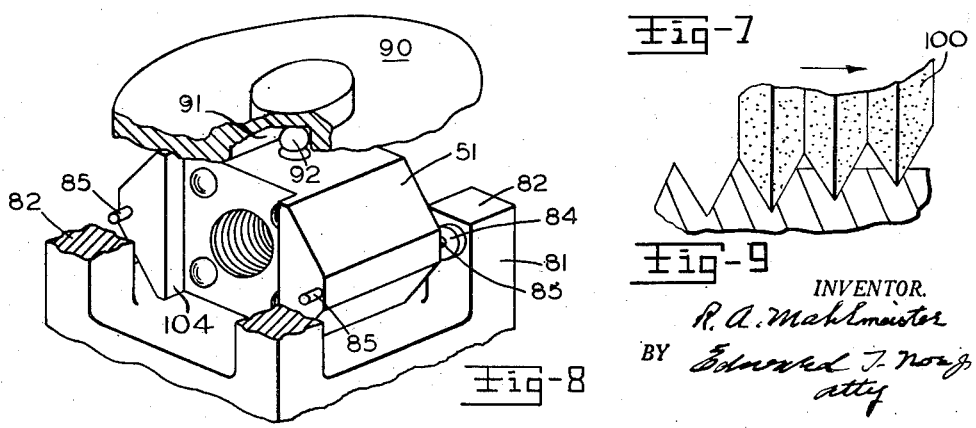
INVENTOR.
R. A. Mahlmeister
BY Edward J. Noig
atty

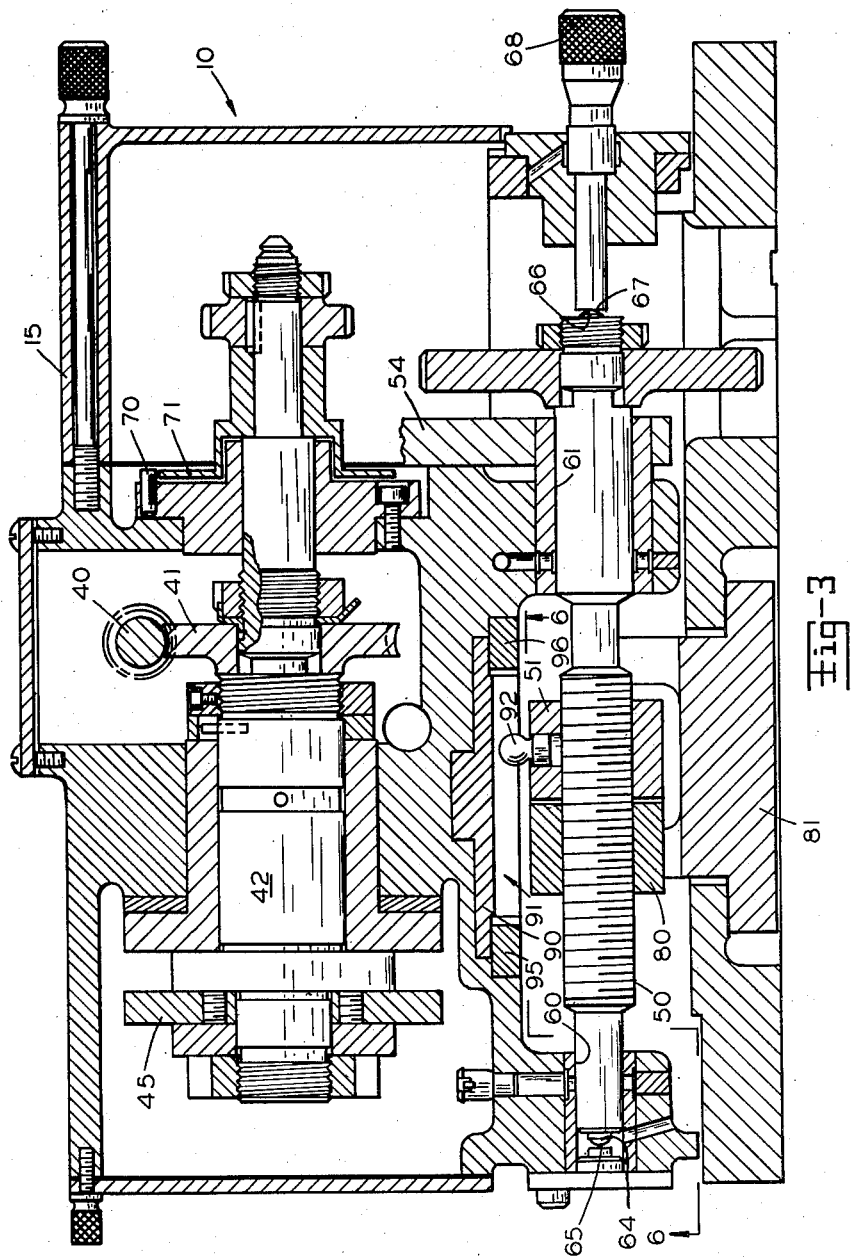

April 15, 1958 R. A. MAHLMEISTER 2,830,572
MACHINE TOOL

Filed Oct. 25, 1955 3 Sheets-Sheet 3

INVENTOR.
R A Mahlmeister
BY Edward T. Noji
atty

United States Patent Office 2,830,572
Patented Apr. 15, 1958

2,830,572
MACHINE TOOL

Raymond A. Mahlmeister, Dayton, Ohio, assignor to The Cinatool Corporation, Dayton, Ohio, a corporation of Ohio Application October 25, 1955, Serial No. 542,738

15 Claims. (Cl. 125—11)

This invention relates to precision drive means for machine members and more particularly to feed screw drive means for grinding wheel dressing units.

It is an object of this invention to provide a precision drive for machine members wherein a feed screw and nut are relatively rotated, the nut being supported with freedom for movement transverse the axis of the feed screw to insure perfect alignment of a screw and nut and maintain precise and uniform drive in an economical and simple manner.

It is a further object to provide a drive for relative movement of two members, one of the members supporting a feed screw with a nut threaded thereabout and abutment means cooperating between the other member and nut limiting endwise movement of the nut relative thereto and allowing removal of the nut while assembled or screw merely by removing the screw itself, whereby the one member, feed screw and nut can be readily removed and placed for assembly as a unit.

It is a further object to provide such a drive wherein provision is made for obtaining a limited rotation to the nut as the member and nut relatively move, thus varying the relative displacement between the members per screw rotation for feed compensation and adjustment.

It is a further object to provide such a drive wherein guide means cooperating between the screw supporting member and nut give a limited rotation to the nut as the member and nut relatively move, thus varying the relative displacement between the members per screw rotation for feed compensation and adjustment.

It is a further object to provide a precision drive for relative movement of two members such as the housing and base of a dressing unit for ribbed grinding wheels wherein a feed screw and nut drive has two pairs of driving contacts, one pair for movement in each respective direction, friction drag means being provided cooperating between the members to maintain the operative driving contacts firmly in engagement for smooth and uniform movement and to maintain the members relatively stationary upon drive reversal and during taking up of lost motion before further movement in the reverse direction.

Figure 4:
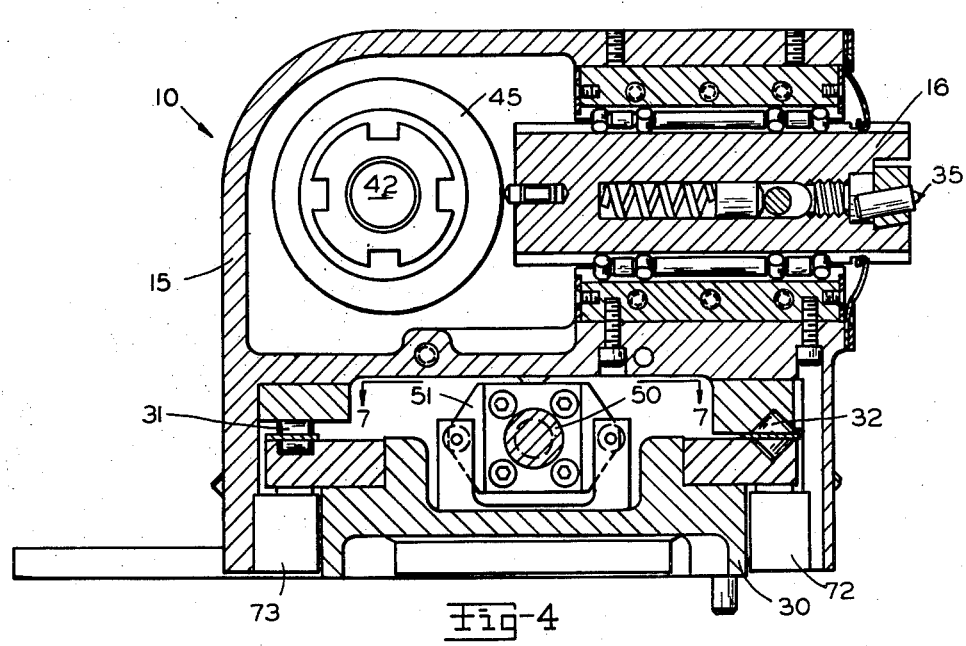
Figure 5:
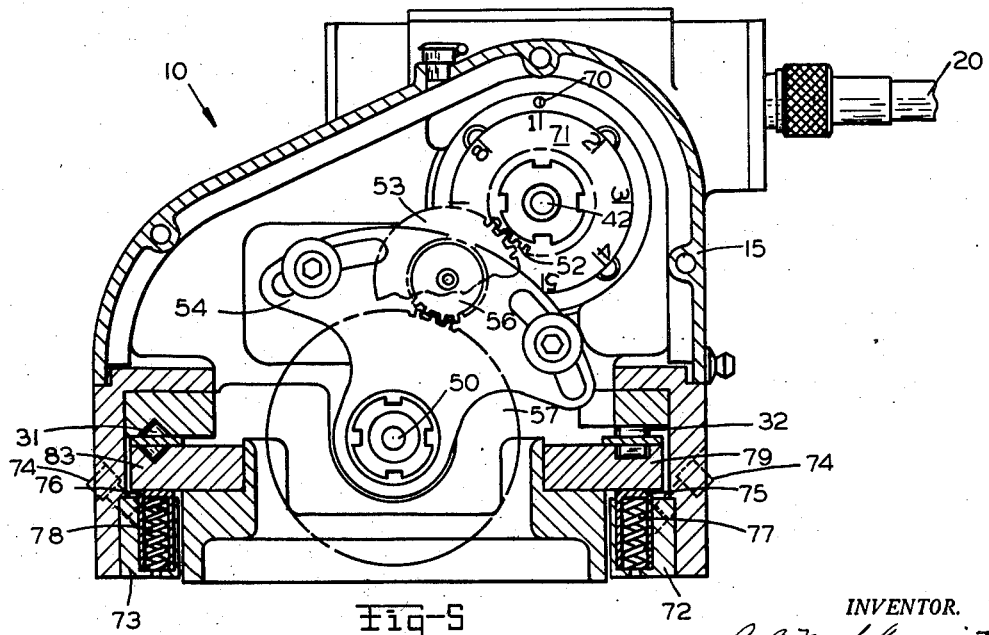

Other objects and advantages of the invention will be apparent from the following description, the appending claims, and the accompanying drawings, in which, Figure 1 is an end view in elevation of a dressing unit for forming a ribbed grinding wheel embodying the present invention, Figure 2 is a plan view of the unit of Figure 1, Figure 3 is a longitudinal view in section taken on line 3—3 of Figure 1, Figure 4 is a transverse section on line 4—4 of Figure 2, Figure 5 is a transverse section taken on line 5—5 of Figure 2, Figure 6 is a fragmentary view, partially broken away, taken generally on line 6—6 of Figure 3, Figure 7 is a fragmentary view taken on line 7—7 of Figure 4, Figure 8 is a perspective view, partially broken away, of the lead nut support and control structure, and Figure 9 illustrates a grinding wheel dressed by the unit of the present invention during traverse grinding of a thread form.

The present invention is adapted for use wherever precision drives by means of a feed screw and nut arrangement are used for obtaining rectilinear movement from feed screw rotation and, for illustrative purposes, has been shown as embodied in a dressing unit for forming a ribbed grinding wheel by means of a diamond tool. The invention has use in other applications and in other embodiments than those specifically illustrated.

In the illustrated unit, a unit housing is traversed along the axis of a rotating grinding wheel while a reciprocating diamond tool carried by the housing is directed in forming contact with the wheel surface. When such a unit is used for dressing grinding wheels to be used in grinding precision threads or the like it is important that the reciprocating feed movements and traverse movement of the housing be precisely coordinated and that the housing movement be smooth, uniform, and precise in order that the grinding wheel be properly formed.

The present invention provides a screw and nut drive mechanism for relative movement between an operated member and a supporting member wherein the nut is restrained against axial movement relative to one of the members and is carried with freedom for radial movement except as restrained by the feed screw onto which it is threaded. In the illustrated embodiment the cooperating screw has driving contacts at the respective ends thereof in association with opposed contacts on the other of the members for relative movement between the members upon screw rotation. Due to the freedom for radial movement of the nut variations or errors in alignment, eccentricity, and the like are eliminated to insure a uniform and precise movement of the drive. An adjustment has been provided through an adjustable guide means cooperating between the feed screw carrying member and the feed nut whereby, as the member moves relative to the nut, the nut is simultaneously rotated to vary the amount of relative movement per screw rotation as desired. This provides a precision compensation and adjustment for such devices. Drag means cooperating between the relatively movable members maintain the operative set of driving contacts firmly in engagement during movement in both directions and, upon reversal in the direction of movement, the operated member is maintained stationary until drive in the reverse direction commences.

Referring more particularly to the drawings for illustrative purposes a dressing unit 10 mounted on an adjustable support 11 is shown in association with a grinding wheel 12 for forming ribs thereon. The conventional drive and other details of the grinding machine have been omitted.

In the particular illustrated application the housing 15 of the unit is traversed along the axis of the grinding wheel 12 while a tool support 16 is reciprocated relative thereto in timed relation with the traverse for forming the wheel. A drive 20 leading from a reversable electric motor mounted on fixed structure and not illustrated is automatically reversed at adjusted limits of travel through the actuation of switches 22 and 24 by means of adjustable contacts 26 and 27 carried by housing 15.

Housing 15 is supported and guided for its movement on a base 30 by roller supports 31 and 32. Tool support 16 is similarly mounted on guiding and carrying rollers. This support as well as the mounting for diamond tool 35 is shown most particularly in Figure 4.

Shaft 20 leads to a worm 40 and through worm gear 41 drives an upper shaft 42, the left hand end of which as seen in Figure 3 supports and drives a cam 45 which engages tool support 16 for reciprocation thereof.

Through gearing at the other end of shaft 42 a feed screw 50 is rotated in timed relationship with reciprocations of the tool support for lead control. Referring particularly to Figure 5 it will be seen that gear 52 meshes with the larger gear 53 of a pair of gears carried by an adjustable arm 54. Rotation of gear 53 drives smaller gears 56 which in turn rotates gear 57 fixed to the screw. The arm and idler assembly are provided for the ready substitution of change speed gears as desired.

Lead screw 50 is entirely supported from housing 15 for rotation and axial movement relative to the housing in journals 60 and 61 and has driving contacts or abutments at the respective ends thereof in opposed association with contacts carried by the housing. At the lefthand end of the screw as seen in Figure 3 part spherical contact 64 at the end of the screw opposes contact 65 fixed to the housing. A part spherical contact 66 at the other end of screw 50 is in opposition to an adjustable contact 67 on the housing. These cooperating pairs of contacts engage in point contact on the axis of screw rotation, eliminating drunkenness occurring when relatively rotating driving surfaces are not both truly perpendicular to the axis of rotation. Through rotation of knob 68 contact 67 can be adjusted axially to vary the amount of lost motion between the screw and the housing upon drive reversal. This allows a compensation for inherent lost motion in the drive and in adjustment to vary the path of diamond 35 as desired during housing movement in reverse directions. For example, a ribbed grinding wheel can be more accurately and efficiently formed by only using inward tool movements for forming the rib sides. By varying the position of contact 67 the amount of lost motion or delay in traverse upon drive reversal can be varied as desired.

In this exemplary unit the reciprocating feeding movements of diamond 35 continue without delay upon drive reversal as cam 45 is immediately reversed. In operation the diamond 35 is moved along the grinding wheel 12 in one direction, thus dressing the side of each rib which faces generally in the direction of traverse on inward diamond movements toward the wheel axis. By employing the proper amount of lost motion in the traverse drive through adjustment of contact 67 as necessary, traverse drive can be delayed a predetermined amount and the diamond directed in a similar path in the reverse direction which is displaced from the previous path by some part of a wheel pitch distance to dress the oppositely facing wheel sides with inward strokes and clear those sides which were previously dressed with inward movements during traverse in the reverse direction.

Thus by rotating the single cam 45 once for each pitch movement in both directions the identical angles and rib form will be repeated across the wheel and the cam itself will have an extremely long wear life. By using such a cam in conjunction with adjustment 68 the diamond can be directed in identical paths in both directions which paths are relatively shifted by a desired amount. Similarly the adjustment allows compensation to retrace the same path if desired.

A pointer 70 fixed to the unit housing cooperates with a calibrated dial 71 rotatable with shaft 42. By this arrangement the angular position of cam 45 can be precisely determined and correlated with the traverse positions of the housing 15 in conjunction with adjustments of the lost motion through knob 68 for timing relationships as desired. A similar lost motion adjustment and cam position indicating structure is disclosed in my application Serial Number 408,257 filed February 4, 1954.

As an aid in obtaining as uniform and smooth housing movement as possible, plungers 75 and 76 movable with housing 15 are urged by springs 77 and 78 into engagement with fixed members 79 and 83, see particularly Figure 5. Similar plunger pairs are spaced along the unit. The friction drag provided by this arrangement serves to maintain the operative pair of driving contacts in engagement during traverse in each respective direction firmly in engagement to prevent housing oscillations and obtain a uniform drive. Plungers 75 and 76 are carried by blocks 72 and 73 fixed to housing 15 by screws 74, retaining and locating the housing on the supporting ways. In addition upon reversal in the direction of rotation of feed screw 50 and during the taking up of the lost motion between the screw contacts and the contacts of the housing, this friction drag maintains the housing in a fixed position until drive in the reverse direction takes place. Thus through the provision of these friction drags stability in the operation is insured.

Feed nut 51 is supported and retained in a novel manner to obtain precise lead and drive control and to aid in assembly and dissassembly. The nut is threaded about and supported by screw 50. As will be seen in Figure 7 an auxiliary nut portion 80 is retained against rotation relative to feed nut 51 by seating in a recess 104 but rotates with the feed nut. Nut portion 80 is spring loaded relative to nut 51 to maintain the threads of the nut and auxiliary nut firmly in engagement with the threads of screw 50, centralizing nut 51 and screw 50. A nut retainer 81 mounted on base 30 has four posts or abutments 82 extending upward to each side of screw 50 and at each end of nut 51. Each extension 82 provides a limiting stop 84 in opposed relation with a limit projection 85 on nut 51. Through this arrangement nut 51 is restrained against endwise or axial movement while being free for rotation and for radial movement to remain accurately coaxial with screw 50.

Nut 51 is slidable from between the posts 82 of retainer 81 while threaded on screw 50. Thus by simply removing screws 74 and pressure blocks 72, 73 the housing and feed screw 50, lead nut 51 and auxiliary nut portion 80 can be lifted as a unit from the ways without the necessity for further disassembly. Assembly is accomplished in an equally simple manner. Relative eccentricity between journals 60 and 61 and the threaded portion of lead screw 50 will not influence the lead movement because of the radial freedom of nut 51.

Means are provided to restrain nut 51 against free rotation and in the illustrated apparatus this means also provides an adjustment for varying the amount of movement of housing 15 per revolution of feed screw 50. A guide member, shown as a disk 90 carried for adjustable rotation from the housing 15, provides a guiding groove 91 into which a spherically formed radial follower 92 on nut 51 extends.

Disk 90 is carried for rotation in the housing casting and is maintained in position by plates 95 and 96. Relative adjustment of plungers 97 and 98 engaging cutout portions in disk 90, see Figure 6, rotate the disk to adjusted positions as desired. Rotation of spring loaded plunger 97 through knob 101 serves to set the position of the disk and by rotating knob 100 plunger 98 is moved inward to lock the disk 90 in position.

As housing 15 traverses it carries disk 90 and moves guiding groove 91 along follower 92 on nut 51. By varying the angular adjustment of the guiding groove 91 the lead normally obtained through rotation of screw 50 can be varied as desired. The movement of housing 15 per revolution of screw 50 and the relationship of housing movement to reciprocation of support 16 can thus be adjusted.

This provides an extremely valuable adjustment in dressing units of this character. While using the same set of charge speed gears the pitch of the dressed wheel form can be varied as desired. An infinite variation in lead within the range of adjustment is possible and metric or unusual pitches can be easily obtained without changing lead drive components.

Another valuable application is in the dressing of tapered grinding wheels for traverse thread grinding. Ordinarily, the wheel is dressed to a conventional full rib form and the crests are topped along the wheel to a conical taper. It will be appreciated that with such a form during grinding if the wheel pitch and machine lead are not identical rib sides on the work will have a stepped configuration.

By using the lead adjustment provided by the present invention grinding wheels for this purpose can be dressed with each rib having a full form while the rib crests are progressively enlarged in diameter. In Figure 9 a grinding wheel 100 dressed to this form is shown as it progressively grinds a thread form into a work piece 101 during traverse to the right. In grinding by means of a wheel dressed in this manner the rib sides on the work will be smooth and of the proper angle. In dressing such a form the dresser unit 10 is angularly adjusted relative to the grinding wheel axis for the desired taper. This of course varies the normal wheel pitch obtained with the dresser and changes the angle of the rib sides which would be obtained. A cam with a similarly modified contour can be used to obtain the proper angle on the rib sides while disc 90 is rotated to give the desired lead. Such an adjustment cannot be made with known dressers and forms of this character cannot be readily obtained.

Thus it is seen that a precision drive mechanism has been provided for machine components such as a dressing unit for forming ribbed grinding wheels. Through the radial freedom allowed the feed nut in this application various errors have been eliminated and a smooth and uniform drive assured. The adjustment for providing a concurrent rotation of the feed screw with movement of the unit housing provides an extremely accurate and useful means for adjusting and varying housing movement per revolution of the feed screw. The friction drag operating between the base and housing provides in an extremely simple structure apparatus for maintaining smoothly uniform operation of the device.

While the form of apparatus herein described constitutes a preferred embodiment of the invention, it is to be understood that the invention is not limited to this precise form of apparatus, and that changes may be made therein without departing from the scope of the invention which is defined in the appending claims.

What is claimed is:

1. A dressing unit for forming a multiple ribbed grinding wheel, said unit comprising a dressing cutter, means supporting said cutter for movement in a dressing operation, interdriven actuating means operatively connected to said supporting means for moving said cutter including lead means for determining the cutter movement generally along the grinding wheel and feed means for determining the cutter movement toward and from the grinding wheel axis, drive means connected for simultaneous operation of said lead and feed means, and adjustable means in said unit operable to obtain an infinite adjustment of said lead within a given range of adjustment including manually adjustable setting means for controlling rib spacing and contour on the grinding wheel whereby the form of the work to be ground is readily controlled.

2. A dressing unit for forming a multiple ribbed grinding wheel, said unit comprising a base, a dressing cutter, movable means on said base supporting said cutter for movement in a dressing operation, interdriven drive means in said unit for moving said cutter including a lead nut and driven lead screw determining the cutter movement along the grinding wheel and feed means for determining the cutter movement toward and from the grinding wheel axis, and adjustable compensating means in said unit cooperating between said base and movable means operable to obtain a controlled rotation of said lead nut upon cutter movement along the grinding wheel whereby the lead movement is infinitely variable within a given range of adjustment.

3. Drive means for precision movement of an operated member with respect to a supporting member comprising a feed screw rotatably carried by one of said members, cooperating abutment means on said screw and said one member, a feed nut threaded on said screw, means limiting rotation of said feed nut about the axis of said screw while allowing free radial movement except as limited by said screw, additional nut means threaded on said feed screw adjacent said feed nut, means relatively biasing said feed nut and said nut means axially in opposite directions, restraining means comprising cooperating opposing surfaces on the feed nut and nut means engageable to prevent relative rotation therebetween while allowing relative axial movement, and abutment means on the other of said members cooperating with opposite sides of said feed nut to cause relative movement of said members upon rotation of said feed screw.

4. Drive means for precision movement of an operated member with respect to a supporting member comprising, guide and supporting means cooperating between said members, a feed screw rotatably carried by one of said members, cooperating abutment means on said screw and said one member, a feed nut threaded on said feed screw and supported thereby, means limiting rotation of said nut about said feed screw, abutment means on the other of said members engageable only by opposite sides of said nut to limit endwise movement thereof while leaving said nut free for removal from the abutment means while threaded on said feed screw, and to cause relative movement between the members upon rotation of said feed screw whereby said members can be readily separated with said feed screw and nut remaining assembled on said one member.

5. Drive means for precision movement of an operated member with respect to a supporting member comprising a feed screw, means supporting said feed screw on one of said members for rotation and endwise movement relative thereto, cooperating abutment means on one of said members and at each end of said feed screw for engagement in point contact on the axis of feed screw rotation including substantially point contacts on each end of the screw and opposing planar surfaces on the respective member, a feed nut threaded on said feed screw, means cooperating between one of said members and said feed nut restraining said feed nut against free rotation while allowing radial movements thereof except as limited by said screw, abutment means on the other of said members engageable by said feed nut to limit endwise movement thereof on said other member while allowing free radial movement, whereby the members are relatively moved upon rotation of the said feed screw.

6. Drive means for precision movement of an operated member with respect to a supporting member comprising a feed screw, means supporting said feed screw on one of said members for rotation and endwise movement relative thereto, cooperating abutment means on one of said members and at each end of said feed screw for engagement in point contact on the axis of feed screw rotation, a feed nut threaded on said feed screw, additional nut means threaded on said feed screw adjacent said feed nut, means relatively biasing said feed nut and said nut means axially in opposite directions, abutment means cooperating directly between the feed nut and nut means allowing relative axial movement while preventing relative rotation therebetween, means cooperating between one of said members and said feed nut restraining said feed nut against free rotation while allowing radial movements thereof except as limited by said screw, abutment means on the other of said members engageable by said feed nut to limit endwise movement thereof on said other member while allowing free radial movement, whereby the members are relatively moved upon rotation of said feed screw.

7. Drive means for precision movement of an operated member with respect to a supporting member comprising a feed screw, means supporting said feed screw on one of said members for rotation and endwise movement relative thereto, cooperating abutment means on one of said members and at each end of said feed screw for engagement in point contact on the axis of feed screw rotation, a feed nut threaded on said feed screw, means cooperating between one of said members and said feed nut restraining said feed nut against free rotation while allowing radial movements thereof except as limited by said screw, abutment means on the other of said members engageable by said feed nut to limit endwise movement thereof on said other member while allowing free radial movement, whereby the members are relatively moved upon rotation of said feed screw, said restraining means including guide means cooperating between said one member and said feed nut for automatically obtaining rotational movements of said feed nut upon relative movements between said members.

8. Drive means for precision movement of an operated member with respect to a supporting member comprising a feed screw, means supporting said feed screw on one of said members for rotation and endwise movement relative thereto, cooperating abutment means on one of said members and at each end of said feed screw for engagement in point contact on the axis of feed screw rotation, means adjustably mounting one of said contacts on said one member to vary the amount of play between the screw and member as desired, a feed nut threaded on said feed screw, means cooperating between one of said members and said feed nut restraining said feed nut against free rotation while allowing radial movements thereof except as limited by said screw, abutment means on the other of said members engageable by said feed nut to limit endwise movement thereof on said other member while allowing free radial movement, whereby the members are relatively moved upon rotation of said feed screw.

9. Drive means for precision movement of a member along a supporting base comprising means mounting said member on said base for rectilinear movement therealong, a feed screw, means on said member forming the sole support for said screw and carrying the screw for rotation and for axial movement relative to the member, a nut threaded on said screw, limit means on said base cooperating with said nut to restrain the nut against axial movement but leaving the nut free for rotation and radial adjustment, guide means on said member extending generally along the axis of said screw, a follower on said nut cooperating with said guide means during movement of said member to determine the rotational position of said nut while leaving the nut radially unrestricted, contact means at each end of said screw cooperating with said member for movement thereof upon endwise screw movement in the respective directions, and means operatively connected to said screw for rotation thereof to move said member in directions as desired.

10. Drive means for precision movement of a member along a supporting base, comprising means mounting said member on said base for rectilinear movement therealong, a feed screw, means on said member carrying said screw for rotation and for axial movement and forming the sole support therefor, a nut threaded on said screw, limit means on said base restraining said nut against axial movement while leaving the nut free for rotation and radial adjustment, guide means on said member extending generally along the axis of said screw, a follower on said nut cooperating with said guide means during movement of said member along said base to determine the rotational position of said nut, means carried by said member for adjusting the angular position of said guide means whereby nut rotation upon member movement is varied to adjust the amount of member movement per screw rotation, contact means cooperating between said screw and said member, and means operatively connected to said screw for rotation thereof to move said member in directions as desired.

11. Drive means for precision movement of a machine tool component such as the housing of a diamond dresser, comprising a base, means mounting said component on said base for rectilinear movement therealong, a feed screw, means on said component carrying said screw for rotation and axial movement relative thereto and forming the sole support therefor, a nut threaded on said screw, limit means on said base extending in opposed relationship to each end of said nut, contact means on said nut in engagement with said limit means restricting the nut against axial movement while leaving it free for rotation and for radial adjustment, a guide member mounted for rotational adjustment in said component and including a groove extending therealong, a follower on said nut extending into said groove whereby the rotational position of the nut is controlled while leaving the nut radially free, means cooperating between said drive screw and said component for driving the component along its line of movement upon endwise screw movement in respective directions, means operatively connected to said screw for rotation thereof to move said component in directions as desired, and means for adjusting said guide member to give a simultaneous rotation of said nut as the component advances whereby component movement per feed screw rotation can be varied as desired.

12. A dressing unit for forming ribbed grinding wheels and the like comprising a base, a unit housing, means mounting said housing on said base for rectilinear movement therealong, support means for a dressing tool carried in said housing for reciprocation along a path transverse the direction of housing movement, a feed screw, means in said housing forming the sole support for said screw, a feed nut threaded on said screw, limit means projecting from said base at each side of said screw and each end of said nut for engagement with said nut to restrict its axial movement while leaving the nut free for rotation and radial adjustment, a guide member rotatably adjustable in said housing and including a guiding groove extending generally along the axis of said feed screw, a follower on said nut projecting into said groove, means cooperating between said screw and said housing for housing movement in respective directions upon screw rotation, drive means operatively connected to said dressing tool support means and to said screw, adjustment means associated with said guide member for adjustable rotation thereof to obtain a variable rotation of said nut upon housing movement whereby the housing movement obtained with a given feed screw rotation can be adjusted as desired.

13. A dressing unit for forming ribbed grinding wheels and the like, comprising a base, a unit housing, means on said base mounting said housing for rectilinear movement along the axis of a grinding wheel to be dressed, support means for a dressing tool mounted in said housing for movement toward and from the axis of a grinding wheel to be dressed, a feed screw carried by said housing for rotation and for axial movement, feed nut means on said base threaded on said screw, cooperating driving contacts on each end of said screw and on said housing for engagement upon endwise screw movement in the respective directions, said cooperating contacts including an adjustable contact in said housing at one end of said screw for varying the amount of lost motion between the screw and housing upon drive reversal, and reversible drive means operatively connected to reciprocate said tool support means and rotate said screw in timed relation, friction drag means cooperating between said base and said housing for maintaining the housing firmly in engagement with the driving contacts during lead screw movement and for maintaining the housing stationary upon drive reversal and during the takeup of the lost motion.

14. A dressing unit for use in forming ribbed grinding wheels and the like, comprising a base, a unit housing supported on said base for rectilinear movement therealong, support means for a dressing tool mounted in said base for reciprocation along a path transverse the path of housing movement, a feed screw, means in said housing forming the sole support for said screw and carrying the screw for rotation and for axial movement relative thereto, a feed nut threaded on said screw, limit means on said base in position for engagement with the respective ends for said nut to restrict its axial movement while leaving it free for rotation and radial adjustment, a rotatable guide member carried in said housing including a guiding groove extending therealong, a follower extending radially from said nut and into said guiding groove whereby the nut is restrained against free rotation but unrestricted radially, cooperating driving contacts at each end of said screw and on said housing for engagement upon screw movement in respective directions, said contacts including an adjustable contact in said housing at one end of said screw to vary the amount of lost motion between the housing and screw upon drive reversal as desired, reversible drive means operatively connected to reciprocate said tool support and rotate said screw in timed relation, adjustment means cooperating with said guide member to vary the direction of said guiding groove whereby variable rotation of said nut upon housing advance can be obtained to adjust the amount of housing movement per rotation of said screw as desired, and friction drag means cooperating between said base and said housing for maintaining the operative driving contacts in from engagement during screw movement and to restrain the housing against movement upon drive reversal and during the taking up of lost motion.

15. Drive means for obtaining precision movement between relatively movable members comprising a drive assembly supported by one of said members, said assembly comprising a rotatable feed screw, cooperating abutment means on said screw and one of said members restricting relative endwise movement therebetween, a feed nut threaded on said screw, means for obtaining controlled rotation of said feed nut about the axis of said screw while allowing free radial movement except as limited by said screw, addition nut means threaded on said feed screw adjacent said feed nut, means relatively biasing said feed nut and nut means axially in opposite directions, engageable means cooperating between said feed nut and nut means allowing relative axial movement therebetween while restricting the feed nut and nut means for rotation together, and abutment means cooperating between said feed nut and the other of said members to prevent relative endwise movement whereby relative movement between the members is obtained.

References Cited in the file of this patent

UNITED STATES PATENTS

| | | |
|---|---|---|
| 226,162 | Darling | Apr. 16, 1880 |
| 788,604 | Schlosser | May 2, 1905 |
| 1,371,606 | Daniels | Mar. 15, 1921 |
| 2,007,717 | Harley | July 9, 1935 |
| 2,321,442 | Wilson | June 8, 1943 |
| 2,407,341 | Meyer | Sept. 10, 1946 |
| 2,663,292 | Mottu | Dec. 22, 1953 |

FOREIGN PATENTS

| | | |
|---|---|---|
| 2,328 | Great Britain | Jan. 30, 1904 |
| 815,746 | France | Apr. 12, 1937 |
| 912,447 | France | Apr. 29, 1946 |